US011329484B2

(12) United States Patent
Hinterberger et al.

(10) Patent No.: US 11,329,484 B2
(45) Date of Patent: May 10, 2022

(54) ELECTRIC ENERGY SUPPLY DEVICE COMPRISING A PLURALITY OF USAGE UNITS WHICH ARE CONNECTED IN ORDER TO FORM STRANDS, AND METHOD FOR OPERATING SUCH AN ENERGY SUPPLY DEVICE

(71) Applicant: AUDI AG, Ingolstadt (DE)

(72) Inventors: Michael Hinterberger, Großmehring (DE); Berthold Hellenthal, Schwanstetten (DE); André Blum, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 287 days.

(21) Appl. No.: 16/625,153

(22) PCT Filed: May 18, 2018

(86) PCT No.: PCT/EP2018/063112
§ 371 (c)(1),
(2) Date: Dec. 20, 2019

(87) PCT Pub. No.: WO2018/233956
PCT Pub. Date: Dec. 27, 2018

(65) Prior Publication Data
US 2021/0359513 A1    Nov. 18, 2021

(30) Foreign Application Priority Data

Jun. 23, 2017   (DE) .................... 10 2017 210 618.2

(51) Int. Cl.
*H02J 1/12* (2006.01)
*H02J 1/08* (2006.01)
*H02J 3/46* (2006.01)

(52) U.S. Cl.
CPC ........ *H02J 1/12* (2013.01); *H02J 1/08* (2013.01); *H02J 3/46* (2013.01)

(58) Field of Classification Search
CPC ........ H02J 1/12; H02J 1/08; H02J 3/46; H02J 7/34; H02J 1/10
See application file for complete search history.

(56) References Cited

U.S. PATENT DOCUMENTS 7,087,327 B2    8/2006  Pearson
8,330,301 B2   12/2012  Demetriades et al.
(Continued)

FOREIGN PATENT DOCUMENTS

DE          100 10 985 A1     9/2001
DE     10 2010 049 611 A1     6/2011
(Continued)

OTHER PUBLICATIONS

English-language translation of International Preliminary Report on Patentability dated Jan. 2, 2020, in corresponding International Application No. PCT/EP2018/063112; 10 pages.
(Continued)

*Primary Examiner* — Daniel Cavallari
(74) *Attorney, Agent, or Firm* — Maier & Maier, PLLC (57) ABSTRACT

The disclosure relates to an electrical energy-supply device including several usage units, wherein each usage unit is adapted to generate or temporarily store electrical energy, and wherein a control means is adapted to control an exchange of power (E) between the energy-supply device and at least one device, The invention provides that the usage units of the energy-supply device are divided into strands and the usage units of each strand are connected to a series connection and the series connection is connected via a DC converter and at least one galvanically isolable switching unit is connected to a busbar arrangement.

20 Claims, 2 Drawing Sheets

(56) References Cited

U.S. PATENT DOCUMENTS

| | | | |
|---|---|---|---|
| 9,136,726 B2 | 9/2015 | Shinozaki | |
| 2006/0092583 A1 | 5/2006 | Alahmad et al. | |
| 2009/0066291 A1 | 3/2009 | Tien et al. | |
| 2013/0057210 A1 | 3/2013 | Nergaard et al. | |
| 2014/0197686 A1 | 7/2014 | Hiramura et al. | |
| 2014/0203650 A1 | 7/2014 | Striuli | |
| 2016/0368392 A1* | 12/2016 | Braun | H02M 7/44 |
| 2017/0317500 A1* | 11/2017 | Kumar | H02H 3/16 |

FOREIGN PATENT DOCUMENTS

| | | | | |
|---|---|---|---|---|
| DE | 10 2011 054 145 A1 | 4/2012 | | |
| DE | 10 2011 056 377 A1 | 1/2013 | | |
| DE | 10 2011 079 874 A | 1/2013 | | |
| DE | 10 2013 013 673 A1 | 7/2014 | | |
| DE | 102014205977 A1 * | 10/2015 | | B60L 3/0092 |
| DE | 10 2016 223 470 A1 | 6/2017 | | |
| EP | 2 560 264 A2 | 2/2013 | | |
| WO | 2013/021364 A1 | 2/2013 | | |

OTHER PUBLICATIONS

Examination Report dated Mar. 12, 2018 in corresponding German application No. 10 2017 210 618.2; 14 pages including Machine-generated English-language translation.

International Search Report dated Aug. 1, 2018 in corresponding International application No. PCT/EP2018/063112; 36 pages including Machine-generated English-language translation.

* cited by examiner

ELECTRIC ENERGY SUPPLY DEVICE COMPRISING A PLURALITY OF USAGE UNITS WHICH ARE CONNECTED IN ORDER TO FORM STRANDS, AND METHOD FOR OPERATING SUCH AN ENERGY SUPPLY DEVICE

FIELD

The disclosure relates to an electrical energy-supply device including several usage units. The energy-supply device can be, e.g., a stationary energy storage device or a vehicle battery for an electric vehicle. The usage units cab be, e.g., battery cell modules. Generally, each usage unit is adapted to generate, temporarily store, or dynamically redistribute electrical energy. The disclosure also includes a method for operating the electrical energy-supply device in order to exchange energy with at least an apparatus external to the device by means of the usage units.

BACKGROUND

An energy-supply device of the said type is known, e.g., from U.S. Pat. No. 7,087,327 B2. It describes that an energy-supply device can comprise a series connection of fuel-cell stacks, which together may supply a voltage for a device connected to the energy-supply device. Each stack of fuel cells can be individually electrically bridged by a diode in the series circuit, such that it does not block or shut down the entire energy-supply device in case of a defect. The series connection has replacement fuel-cell stacks, which will allow for continued supply of voltage even in case of a fuel cell-stack failure. A replacement fuel-cell stack will remain idle, until it is needed due to a defect in another fuel-cell stack. Several of these series connections may be connected in parallel in order to provide a greater operating current. Switches for setting a specific switching constellation as fuel-cell stacks are provided. A disadvantage of this arrangement is that the output current can only be controlled within each individual fuel-cell stack due to the required free configurability, which makes the energy-supply device expensive to produce.

Another energy-supply device with several usage units in the form of energy storage elements is known from US 2006/0092583 A1. The individual energy storage elements can also be combined to form different switching constellations by means of several switches. Galvanic isolation between the individual storage elements is not provided.

SUMMARY

The object of the invention is to provide a reliable and freely configurable energy-supply device.

The invention provides an electrical energy-supply device with several usage units, wherein each usage unit (e.g., a capacitor) is adapted to generate, temporarily store, or dynamically redistribute electrical energy.

In order to enable flexible configurability and robustness against failures, the invention provides that for usage units of the energy-supply device to be divided into rows or strands. Each strand therefore contains a few of the usage units. In each strand, the usage units are connected in series. The series connection via a DC converter with a strand end of the strand [sic] and each strand end is in turn connected to a busbar arrangement of the energy-supply device via a respective galvanically separable switching unit. Generally, the DC converter may be a step-up or step-down boost converter, or an inverse converter. As a DC converter, a step-down converter is preferably used. A galvanically separable switching unit is a mechanical switching switching unit [sic], e.g., a contactor. The series connection of each strand may be individually decoupled from or coupled to the busbar arrangement by means of at least one galvanically separable switching unit, either as an option or alternately. A current flowing from the strand into the busbar arrangement can be adjusted or reset with respect to the amperage by means of the DC converter.

Within each strand, a bridging circuit is provided for each usage unit. This means that each series connection can be optionally connected to and disconnected from the busbar arrangement, and moreover, it is possible within each strand to set whether each usage unit is either connected to or bridging the series connection.

A control means is adapted to control the energy exchange between the energy-supply device on the one hand, and at least one device coupled to the energy-supply device, on the other. This makes it possible for each usage unit to set individually whether it participates or is involved in an energy exchange with an apparatus connected to the energy-supply device. To control the energy exchange, the control means is adapted to control the respective DC converter of each strand and the at least one switching unit of each strand, as well as the bridging circuits of the usage units.

The invention achieves the advantage that the strand current of each individual strand can be set by means of the DC converter for the strand, and moreover, galvanic interruption options are provided for each strand.

Thus, by switching the at least one switching unit of each strand, the control means may be adapted to determine which strand is involved in a current energy exchange operation, and by controlling the respective DC converter of each strand, which current is provided by the respective strand, and by switching the bridging circuits of each strand, determine which usage unit in the series connection of the strand supplies the current and which unit is bridged and therefore not involved in the energy-exchange process. Thus, in the energy-supply device according to the invention, it may be determined individually for each usage unit, whether it is involved in an energy exchange operation and its amperage load.

A development provides that each usage unit comprises at least one battery cell, in particular a battery cell module, or a combination of several battery cell modules (e.g., connected in parallel), and/or at least one fuel cell and/or at least one solar panel and/or at least one capacitor and/or at least one generator. Within each strand, the technology applied in the usage units is preferred, but it must be uniform. For example, a strand will contain only battery cell modules, or only solar panels or solar cells. In other words, a mix of different technologies, one per strand, may also be applied or provided in the energy-supply device.

One development provides that a diagnostic unit for recording a current state value of a preset electrical parameter of the respective usage unit is also provided in each usage-unit strands. In other words, the diagnostic unit can be used to measure or record a parameter state value. In this case, the control means is designed to receive, via a communication device of the energy-supply device, the state values of all the usage units of a respective strand and operate only those energy-exchange usage units in the strand, whose state values meet a preset similarity criterion, and electrically bridge each remaining usage unit of the strand by switching the bridging circuits. The control means thus detects the state each of usage unit centrally. The similarity criterion specifies a maximum difference between the state values that are allowed to exist between the usage units employed in a given energy-exchange operation. This makes it possible to react to different wear and/or individual parameter scattering of the usage units in a strand. Only usage units with similar parameter values according to the similarity criterion are actively operated. Old and/or low-power units are initially bridged or disconnected. For example, the control means can determine a wear value as a state value for each usage unit. For example, the wear value may be calculated as a function of the impedance of a usage unit. The higher the impedance, the greater the wear and hence the wear value. In the context of the invention, the term "impedance" signifies an impedance value at a preset frequency, e.g., 0 Hz, or an impedance curve over the frequency f, i.e., an impedance spectrum. The similarity criterion may mean that the difference or the ratio of the largest wear value and the smallest wear value of the employed usage units must be below a preset threshold value. The mean value of the wear values may also be calculated and a tolerance band formed around the mean value, within which all wear values of the employed usage units must be situated, whereby, of course, it is always preferable to employ the usage units with the lowest wear values in order to adjust their wear to the wear of the other usage units.

The respective diagnostic device of a usage unit is preferably adjusted in this way in order to determine an impedance of the usage unit as the respective state value. The diagnostic unit of a usage unit may therefore be used to measure the impedance per usage unit. This can be done in a known manner, e.g., by switching off or electrically disconnecting the usage unit in the series connection and subsequently applying an AC voltage with at least one preset frequency f. The resulting electrical current of the usage unit then provides information about the impedance value at the respective frequency f. Multiple frequencies can be checked in a frequency sweep with a stepwise increase or decrease. Alternatively, at the same time, multi-frequency excitation may be provided at several frequencies. The multi-frequency excitation may be arranged, e.g., as a multisine excitation, a rectangular signal, or a jump signal.

With the energy delivery device, the busbar circuit need not include only two busbars, i.e., a plus busbar and a minus busbar. Instead, for each polarity (plus and minus), several busbars may be provided independently of one another. In this way, a busbar matrix may be created with appropriate wiring, i.e., a flexibly configurable connection structure. If the busbar arrangement has several busbars, at least one strand end of each strand may be connected to the busbar arrangement via several busbar connections, and each strand connection belongs specifically to a different busbar. The at least one switching unit of the strand end is then adapted to select one of the strand terminals in response to a switching signal of the control means and galvanically connect the strand end with the selected strand terminal. This causes the electrical voltage generated by the strand to drop in the associated busbar. Thus, several strand terminals may be provided per strand end with a respective switching unit to enable the strand to be connected alternately to several different busbars. If either strand end is wired or connected to a busbar, the result is a pair of busbars between which, the electrical voltage of the strand drops. One device external to the device, e.g., a motor vehicle, may be connected to the energy-supply device via each pair of strand rails. In order to supply this device with electrical power, a selection of at least one strand may then be connected to the pair of strand rails. Of course, a strand can also be galvanically decoupled from all busbars by means of the at least one switching unit.

A configuration can also be made within a strand by way of the control means. One development provides that in each strand, the relevant bridging circuit of the usage units has at least one semiconductor switch for electrically bridging the respective usage unit. In other words, bridging or connection of a usage unit can be achieved by switching at least one semiconductor switch. This occurs particularly quickly. Thus, while the strand is being operated, i.e., the DC converter of the strand switches in adjacent switching cycles, the control means can either bridge or switch on one of the usage units by switching its bridging circuit between two switching cycles. Thus, the number of connected or switched-on usage units in the series connection of the strand is changed from one switching cycle to another. This makes reconfiguration possible, even as the strand is operated. For example, the electrical voltage generated by the series connection for the DC converter can be adjusted, e.g., if it is too low or too high.

One development provides that, in order to optimize the efficiency in each strand of the operation of the DC converter of the strands, the control means is adapted to adjust its input voltage of the DC converter by means of the bridging circuits by selecting and connecting usage units according to a preset optimization criterion. The optimization criterion indicates the optimum electrical voltage for the DC converter, as known per se from the prior art. Thus, by selecting the number of usage units, this efficiency-optimized voltage can now be set. This can be done during operation, as described above.

The individual voltages generated by the usage units can be added or accumulated by means of the series connection of usage units. According to one development, each strand is adapted to generate a DC voltage in the 8-60 V range or above 60 V by means of its series connection of usage units. However, this may potentially make manual handling of the energy-supply device unsafe, fuse protection is therefore a minimum requirement. This is particularly easily achieved with the energy-supply device according to the invention. For this purpose, the control means is adapted to electrically isolate the usage units from one another by switching their respective bridging circuits to fuse mode, such that only the individual voltages of the usage units are available rather than the sum voltage. The strand can thus be galvanically isolated from the busbar arrangement by means of at least one switching unit, and subsequently the sum voltage of the strand can be split into the individual voltages by bridging the individual usage units. In the fuse mode, for example, the energy-supply device may be disconnected entirely from the sum voltage, if assembly or accident protection is required, or in case of an emergency, or for transport purposes.

The energy-supply device may be designed as a stationary storage device, a stationary energy source, or as a mobile storage device or a mobile energy source, e.g., for a motor vehicle. As a stationary storage device, the energy-supply device may be used, e.g., as a charging station for an electrically driven motor vehicle, or as a stationary storage device for peak-load limitation in an industrial plant.

The invention also includes a method for operating the electrical energy-supply device comprising several usage units. Each usage unit is designed to generate, temporarily store or dynamically redistribute electrical energy in the manner described. The control means controls the energy exchange between the energy-supply device on the one hand, and at least one device coupled to the energy-supply device on the other. In the energy-supply device, the usage units are divided into the aforesaid strands and the usage units are connected in series in each strand. The series connection of each strand is connected via a DC converter and at least one galvanically separable switching unit to a busbar arrangement of the energy-supply device. A bridging circuit is provided for each usage unit within each strand. The energy-supply device can perform the power exchange with the at least one device via the busbar arrangement, whereby the control means for controlling the power exchange controls the respective DC converter of each strand and the at least one switching unit of each strand and the bridging circuits of each usage unit.

The invention also includes developments of the inventive method having the above-described features in connection with the developments of the energy-supply device according to the invention. For this reason, the corresponding developments of the inventive method will not be described again here.

BRIEF DESCRIPTION OF THE DRAWINGS

Below follows a description of exemplary embodiments of the invention. In the figures.

DETAILED DESCRIPTION

Below follows a description of an exemplary embodiment of the invention. In the figures.

The exemplary embodiments explained below represent preferred embodiments of the invention. In the exemplary embodiments, the described components of the embodiments each represent individual features of the invention, which are to be considered independently of one another, and which further develop the invention independently of one another, and are thus also to be considered individually, or in a combination other than the one shown, as part of the invention In addition, the described embodiments may also be supplemented by already described additional features of the invention.

In the figures, functionally identical elements are each provided with the same reference numerals.

Figure 1:
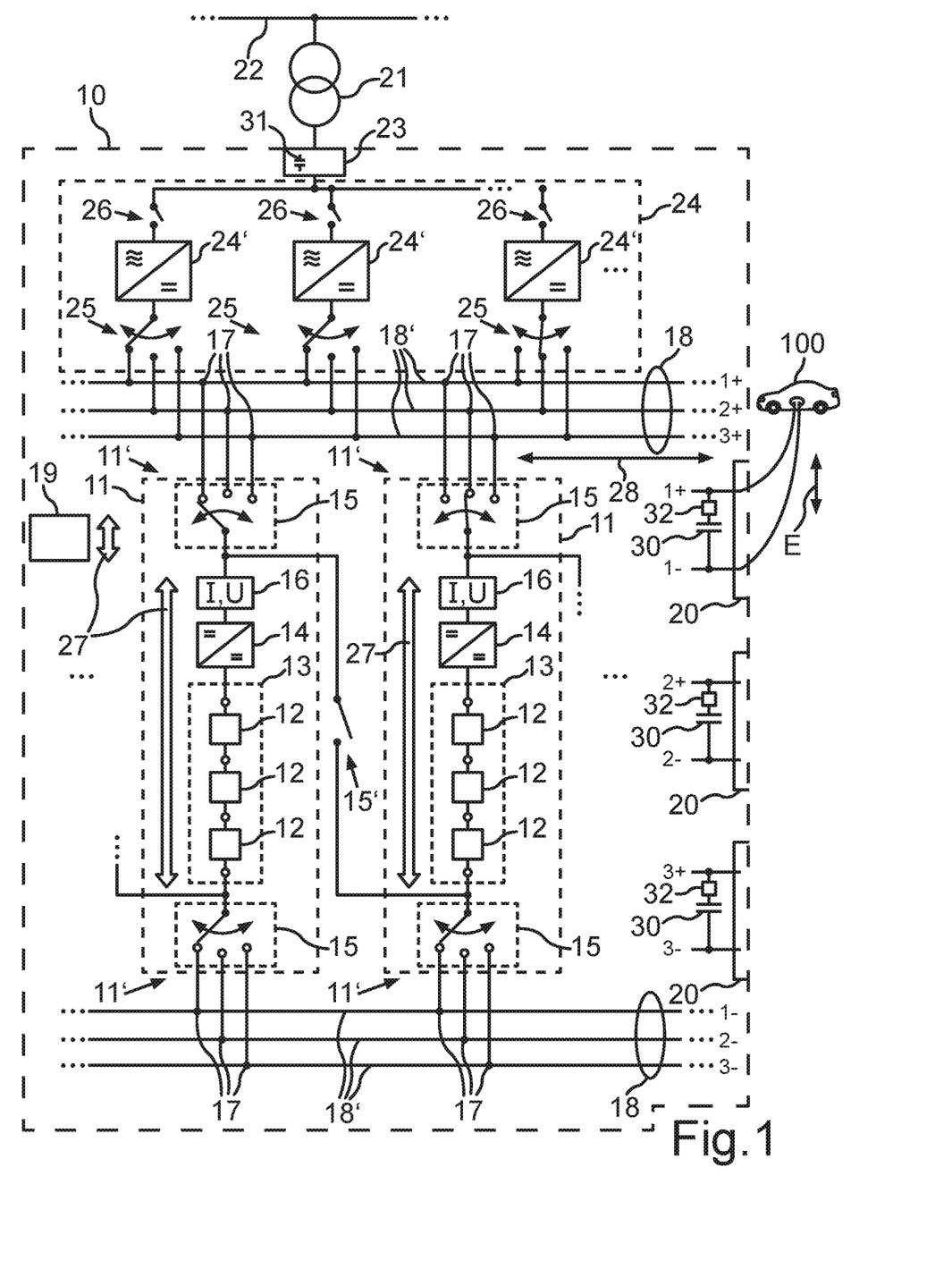
FIG. 1 a schematic representation of an embodiment of the energy-supply device according to the invention.

FIG. 1 shows an electrical energy-supply device 10, which may be adapted as an energy storage device or as a pure energy source, or as a combination thereof. The energy-supply device 10 may be provided, e.g., as a stationary storage for electrical energy. It may, e.g., be installed in a road network. At least one device 100, e.g., an electrically drivable motor vehicle, can then be connected to the energy-supply device 10 in order to charge e.g., a traction battery of the motor vehicle by means of an energy exchange E. The power delivery device 10 may also be intended for use as a mobile battery, a traction battery, or solar storage. As a traction battery, e.g., an electric machine of a traction drive can be connected to the energy-supply device. The energy-supply device 10 can supply at least 1 kW of electrical power in the charged state and/or supply at least 1 kWh of electrical energy.

In the energy-supply device 10, several circuit lanes or strands 11 can be provided for the energy exchange E, whereby in each strand 11, several of the usage units 12 can be connected in series to form a series connection 13. The usage units 12 are thus combined in the energy-supply device 10, that is to say, e.g., in a vehicle traction battery or in an electric stationary storage. The energy-supply device 10 may include a housing in which the strands 11 and the busbar assembly 18 are arranged.

Each usage unit 12 may contain an electrical energy storage and/or a pure source of electrical energy. An energy storage unit may include, e.g., an electrochemical battery cell or a battery cell module with several battery cells, or a capacitor, or a capacitor assembly with several capacitors. Examples of battery cells include those with lithium-ion, lead, solid-state technology. Examples of suitable capacitors are double-layer capacitors (so-called supercaps (R)) with a preferred capacitance of at least 1 mF, in particular at least 100 mF). A fuel cell and a solar cell are each examples of a pure source. As an energy source, a usage unit 12 may include, e.g., a fuel cell, a fuel-cell stack, a solar cell, a solar panel, or a generator e.g., of a power plant (e.g., a pumped storage power plant). A usage unit 12 may also have a parallel connection of, e.g., several battery cells or battery cell modules for increasing the current.

Within each strand 11, the technology used for the usage units 12 is uniform, that is to say, e.g., only battery modules or only solar cells are provided. Each strand 11 thus has usage units 12 of the same technology, as e.g., a battery cell module, each a lithium-ion accumulator. However, mixed technologies may be provided by different strands 11. This means that the energy-supply device may be adapted to an application or a required operating profile. For example, two strands of different technology may be provided, when using the energy-supply device 10 as a traction battery in a motor vehicle, e.g., by splitting the number of usage units 12 like this: 80% energy cells (large storage capacity), 20% energy cells (expensive, but with greater power flow).

For each strand 11, as shown in FIG. 1, in addition to the series connection 13 of the usage units 12, the following may also be provided: a DC converter 14, a mechanical switching unit 15 at either end of the strand 11', a measuring device 16 for a strand amperage I, and/or a voltage measuring device for detecting a sum voltage or a strand voltage U of the strand 11.

Each DC converter 14 may be adapted in a manner known in the art. Generally, the DC converter may be a step-up or step-down converter, or an inverse converter. Each DC converter 14 may in particular be a step-down converter. Each switching unit 15 may be designed to be mechanically switching and, in particular, galvanically isolatable. Each switching unit 15 may have several ON/OFF contactors or (as shown in FIG. 1) a contactor designed as a toggle switch (1-to-N multiplexer). By means of each switching unit 15, the respective strand end 11' can be galvanically connected and disconnected alternately to strand connections 17. Each strand connection 17 constitutes an electrical connection to a busbar 18'. In total, the busbars 18' form a busbar assembly 18 of independent busbars 18'. Each strand connection 17 of a strand 11 can be connected to another busbar 18' of the busbar arrangement 18. For each strand end 11' (positive pole and negative pole), several strand connections 17 can be provided in order to alternately connect strand 11 to several different busbars 18' of the busbar arrangement 18, or to galvanically isolate it from each busbar 18'. By opening the two switching units 15 of a strand 11, the latter can be galvanically decoupled, as well as exchanged, when operating the energy-supply device 10.

Each strand 11 may provide a sum voltage or DC voltage U at the strand terminals 17 by means of the series connection 13. The DC voltage U may be (HV) DC voltage, which may be greater than 60 V, in particular, greater than 100 V. However, DC voltage U in the 8-60 V range may also be provided. A DC voltage is thus applied between two busbars 18', when a strand 11 is galvanically connected thereto. Each strand 11 can be galvanically connected alternately to a pair of busbars 18 using the switching units 15. Strand 11 can be galvanically connected alternately to a pair of busbars by means of the switching units 15, by connecting one end of each busbar 11' to one busbar 18' of the busbar pair, such that the DC voltage U on the busbar pair drops.

The measurement unit 16 may also provide the said total voltage measurement across the strand 11 in order to detect the DC voltage U. The measuring unit 16 is preferably connected downstream of the DC converter 14, as shown in FIG. 1, in order to enable voltage regulation by means of the DC converter 14. As will be explained in connection with FIG. 2, a single-voltage measurement is provided in each usage unit 12.

At least one device 100 can be connected to the strands 11 via the busbar arrangement 18. The busbars 18' of the busbar arrangement 18 thus form a busbar matrix via which, optionally at least one selected strand 11 may be electrically connected to a selected device 100, while another device likewise may be electrically connected to at least one other strand 11. The devices remain galvanically isolated from one another.

A control means 19 can determine which strand 11 is electrically connected to which busbar 18'. The control means 19 can determine a respective energy requirement and/or a respective power requirement of at least one connected device 100, and then select at least one strand 11, whereby the requirement can be met. The device 100 may itself communicate the requirement, e.g., via a communication interface, or it may be stored in the control means 19, e.g., as a fixed value. The control means 19 may then connect the switching units 15 of each selected strand 11 to the busbars 18' leading to the connected device 100.

A second switching unit 15' can be provided between two strands 11 in order to connect two strands 11 in series and thus add their strand voltage. This also allows a higher voltage to be provided between two busbars 18' than can be generated by a single strand 11.

The busbars 18' may each be connected in pairs to an output terminal 20, to which a device 100 may be connected. The connections of the busbars 18' with the individual electrical contacts of the output terminals 20 are shown in FIG. 1 with corresponding numerals 1+, 2+, 3+, 1−, 2−, 3−, where "+" represents plus potential and "−" minus potential or ground potential. The adaptations symbolize three possible busbar pairs 1+, 1− and 2+, 2− and 3+, 3−, whereby the electrical contacts of the output terminals 20 can alternately be adapted in order to be connectable to different busbars 18' by means of a further, not shown switching device. The output terminals 20 can always remain electrically isolated from one another, provided that each busbar 18' of a terminal 20 is galvanically connected to another strand 11.

This may also include simultaneous charging and discharging of different strands 11, e.g., in order to successively supply a device 100 with electrical energy from different strands 11, which are then recharged in the meantime. For example, an electric vehicle (or a device in general) can be charged via a pair of busbars with an output voltage of, e.g., 400 V, while at the same time other strands 11 can be charged via a transformer 21 with a charging voltage of, e.g., 800 V from a supply network 22 or another external energy source. The transformer 21 may be connected to an input terminal 23 of the energy-supply device 10. If the strands 11 are not designed for this charging voltage, they can be connected in series to form a series connection using the switching unit 15'. Galvanic isolation is achieved by using different 18' busbars for the respective strands 11 and/or each voltage level (output voltage and charging voltage, e.g., 400 V and 800 V).

The strands 11 can also be used for creating a power concentration in that an energy source, e.g., a solar system, at the input terminal 23 feeds energy into at least one strand 11 with a first power, whereupon the strand 11 supplies this energy again to a device 100 connected to an output terminal 20 with a second power, which is greater than the first power.

The energy-supply device 10, as a stationary storage device, may for the input terminal 23 optionally have a modular AC/DC converter arrangement 24 with several AC/DC converters 24', which can be switched individually between the busbars 18' by a switching unit 25 to be able to provide a preset amperage and/or a charging voltage for a charging current on a busbar 18', or also galvanically isolate the respective AC/DC converters 24' from the busbar arrangement 18. Further switching units 26 can also be used to provide galvanic isolation from input terminal 23. The switching units 25, 26 may each be formed by a contactor. The switching units 25, 26 can be controlled by the switching device 19. By opening the two switching units 25, 26 of an AC/DC converter 24', the latter can be galvanically decoupled and also exchanged during operation of the energy-supply device 10. The switching units 25, 26 thus represent decoupling switches. The AC/DC converter 24' can be adapted to be galvanically isolating. However, the AC/DC converter arrangement 24 need not necessarily have galvanically isolating AC/DC converters 24'. Other converters are more advantageous. The galvanic isolation can be ensured at any time by means of the mechanical switches of the strands.

A self-sufficient energy source, such as an emergency power generator or a wind turbine, [can] be connected to input connection 23 instead of supply network 22. Conversely, the energy-supply device 10 itself may also have a grid-forming effect, i.e., a network frequency can be specified with respect to other devices connected to the input terminal. This is particularly advantageous for using the energy-supply device 10 in an area without its own supply network 22. AC devices can be operated without adaptation, e.g., on a public power grid. The reverse of grid-forming operation is grid-following operation, i.e., synchronized to a specified grid frequency.

For switching the switching units 15, 15', 25, 26 and the usage units 12, as well as for receiving data from the usage units 12, the control means 19 may be coupled to these components via a communication device 27. The communication device 27 may comprise, for example, a communication bus, e.g., a CAN bus (CAN—Controller Area Network), or an Ethernet.

The control means 19 thus accumulates general knowledge about items that can be switched, e.g., which busbar 18' can be switched to which strand 11. The control means 19 may be at least partially adapted as a central control means for all strands 11 and/or at least partially as a distributed control means per strand 11. It can have a processor device with at least one microcontroller and/or at least one microprocessor. An operating program of the processor device may be adapted to perform the described method steps for operating the energy-supply device 10, when executed by the processor device.

Optionally, capacitors 30, 31 (in particular double-layer capacitors) may be provided at the output terminals 20 and/or at the input terminal 23 in order to buffer peak loads. By means of the usage units 12, peak loads can be operated more gently (in the range up to, say, a duration of, e.g., 3 sec. or 5 sec.), in that the peak load is attenuated. A peak load may be an electrical power greater than the sum of the individual nominal powers of the connected usage units 12, in particular a power greater than 1.2 times the sum.

For switching operation on the busbars 18', a recharging circuit or limiting circuit 32 (switch and resistive element) may be connected in series with the respective capacitor 30, 31 in order to conduct a capacitor current across the resistive element, such that the amperage of the capacitor current is limited to a preset maximum value. The limiting circuit 32 may be used for charging and discharging the respective capacitor 30, 31. A capacitor 30, 31 with its limiting circuit 32 represents a capacitor device. The limiting circuit 32 thus represents a precharge circuit.

Cooling of the strands 11 (in particular of the usage units 12 within the strands 11) can be provided, e.g., on a shelf by arranging a cooling level below the strand level.

Each busbar 18' may be made of aluminum or copper. Aluminum is the less expensive material and weighs less than copper. Aluminum generates a power loss (more than does copper) due to a specific resistance, whereby heating power can be generated for the temperature control of the usage units 12 (in particular battery cells), which can be transferred from the busbars 18' to the usage units 12 via a thermal coupling, e.g., a cooling circuit.

In the case of power distribution with several strands 11 on one busbar 18', the amperage I can be adapted, e.g., adjusted or dynamically shifted, by adjusting/regulating the individual strand currents I via the DC/DC converter 14 of strand 11. Thus, for example, dividing the required total current for the device 100 may be done by division into N strands 11, e.g., N=3, and each strand 11 may generate a current I specifically set therefor, e.g., at N=3: 50%, 25%, 25%.

As a result, the technology of the usage units 12 available in the respective strand 11 can be taken into account, such that the usage units 12 are operated within their specification. Since the electrical voltages U can be determined, the current I can be set by using the DC converter 14 such that, e.g., equalizing currents, which are below a threshold value, flow between the strands 11. This ensures, for example, that with batteries, a current I of up to 300-400 A per battery cell runs only for 15 sec., whereas a continuous current runs only up to 150 A. Each strand 11 can thus be operated using its own operating strategy, i.e., adapted to its technology. A suitable amperage I can be set by means of the DC converter 14.

In addition or alternatively, depending on the line length 28 of the busbar sections extending from a strand 11 to an output terminal 20 (i.e., to a load), the amperage I of the respective strand 11 can be adjusted by the control means 19 by its DC converter 14 in order to adjust the distribution of the amperages I for several strands 11 connected in parallel, depending on the line length 28, and depending on the losses resulting therefrom, such that the losses can be optimized (e.g., minimized or maximized for heating) and/or locally distributed. A strand 11 with a shorter line length 28 of the supply line via the 18' busbars can be assigned a greater amperage I for the minimization than can a strand 11 with a greater line length 28. This offsets the effect of different line lengths. The amperage I can also be set as a function of a current temperature of the line sections. Such power management can compensate for the disadvantage of higher aluminum resistance by specifying and adjusting the amperage of individual line sections.

In short, if required, the control means 19 can thus connect the strands 11 with the currently required feature to the employed busbars 18, which lead to the output terminal 20, where the power is tapped by a connected device 100. Each strand 11 can be coupled as needed by means of its switching units 15. Each strand 11 can be individually discharged/charged. In addition or alternatively, efficiency optimization can be performed for the DC converter 14 within strand 11 by setting its input voltage by selecting and connecting the usage units 12. Thus, the DC converter 14 of each strand 11 can perform two tasks. It limits the strand current I to a predefinable setpoint, such that the usage units 12 can be operated according to their predefined specification (operating limits). The voltage U of the strand 11 can be adapted to the busbar voltage. This allows for the compensation currents between several strands 11 to be reduced. In addition, the DC converter 14 ensures that a specified setpoint voltage is applied to the strand connections 17, irrespective of the number of usage units 12 actively operated in the strand 11.

A current measurement 16 for strand current I can be performed centrally in the measuring unit 16 of strand 11 in the manner described, and is necessary regardless for controlling the DC converter 14.

The central control unit can also reconfigure internally each strand 11 individually, i.e., connect and disconnect usage units 12 in the series connection 13 of strand 11. If, for example, the strand voltage U is lower than a required bus voltage of the connected busbars 18', more usage units 12 can be connected in the series connection 13 of strand 11. This can be done quickly enough by using semiconductor switches (e.g., transistors) so that it can take place during a switching pause of the DC converter 14.

Figure 2:
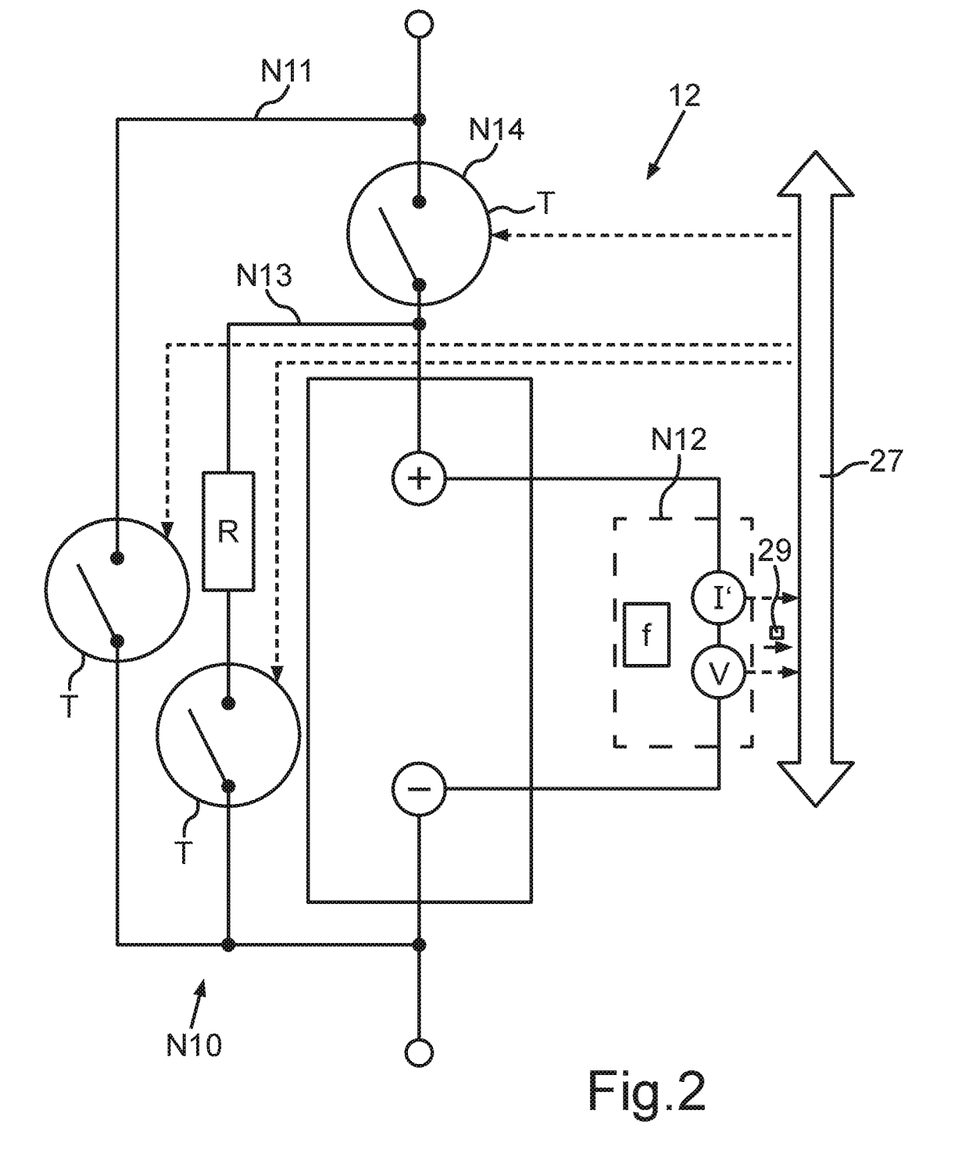
FIG. 2 a schematic representation of a usage unit of the energy-supply device of FIG. 1 with a bridging circuit.

FIG. 2 shows how each usage unit 12 can be electrically bridged, electrically insulated and/or discharged by an individual switching device N10. Semiconductor switches T (transistors) are provided in this way for this purpose. Each usage unit 12 can provide the following functions: bridging/a bridging circuit N11, a diagnostic unit N12, (especially passive) load balancing/a discharge circuit N13, a decoupling/isolating circuit N14. A semiconductor switch T need only block a low voltage, e.g., twice the single voltage V of the usage unit 12. Load balancing can also be carried out actively in a manner known in the art (so-called active load balancing). In addition to the isolating circuit N14 switch, a second switch can also be provided for the second opposite pole (all-pole switching). The diagnostic unit N12 can be configured in a manner known in the art for cell analysis, e.g., an impedance measurement using, e.g., impedance spectroscopy. The diagnostic unit N12 can determine an impedance spectral analysis (0 Hz to, e.g., 3 kHz), a measuring current I' and a single voltage V at several frequencies f per usage unit 12 producing the impedance curve over the frequency f. This represents an impedance spectrum. The diagnostic unit N12 can signal a current state value 29 of a measuring current I' and/or the single voltage V and/or the measured impedance to the control unit 19 via the communication device 27. In the context of the invention, the term "impedance" refers to an impedance value at a preset frequency, e.g., 0 Hz, or an impedance curve over the frequency f. Several frequencies can be checked in a frequency sweep with a gradual increase or decrease. Alternatively, multi-frequency excitation may be provided simultaneously at multiple frequencies. The multifrequency excitation may, e.g., be adapted as a multisine excitation or a square-wave signal, or as a step signal.

This allows for each usage unit 12 to be individually monitored, e.g., in terms of its SoH (State of Health) and/or SoC (State of Charge) and/or SoF (State of Function). The parameters SoH, SoC and SoF are per-se known in the state of the art.

Independent of the impedance measurement, the single voltage V of the usage unit 12 can be measured without the alternating voltage of the impedance measurement. A usage unit 12, which is bridged (by the bridging circuit N11), can also be monitored in terms of its single voltage V. Before activating (closing or electrically conductive switching N14), the single voltage V of usage unit 12 can be individually adjusted by means of load balancing of N13. Optionally, an electrical charging unit can be provided per usage unit 12, which can charge the usage unit 12 individually, even when the semiconductor switch of the isolating circuit N14 is open (this allows for each usage unit 12 to be charged individually). The charging unit can be powered, e.g., via communication device 27 (e.g., using Power-over-Ethernet technology), or via a galvanically isolated energy supply unit.

Mutual interlocking of N11 and N14 can be provided (e.g., by a software application or by means of a logic circuit), such that no short-circuit is generated.

In addition, a temperature measurement by the diagnostic unit N12 or, e.g., the control unit 19, deriving the temperature from the impedance can be provided.

The control unit 19 thus has access to each individual usage unit 12 via the communication device 27. The state of each usage unit 12 can be displayed and the switching device N10 of each usage unit 12 can be controlled, [as can] in particular, the bridging circuit N11 in combination with the isolating circuit N14. By combining the bridging circuit N11 and the isolating circuit N14, a usage unit 12 can be alternately connected and disconnected in the series connection.

On this basis, the wear/condition of each usage unit 12 can be determined centrically in the control means 19 (e.g., in the form of the impedance, as a wear value) and the switching condition of each usage unit 12 can be set depending on the determined condition. Individual usage units 12 can be electrically removed from strand 11 (bridging N11), included (connected in series), individually discharged (discharge resistor R, balancing circuit N13), temporarily electrically disconnected (N14 open/electrically locked), e.g., for diagnostic unit N12.

This makes it possible to react to different wear/individual parameter scattering of the usage units 12 in strand 11. Only usage units 12 with similar parameter values are preferred for active operation. Similarity can be defined by a similarity criterion which, for example, specifies a maximum difference of at least one parameter, whereby the difference may be situated in a range from 10 to 100% (double/half). An old/weak usage unit 12 is initially bridged/disconnected. It can be recognized by a performance criterion, which refers, e.g., to the impedance or is defined in that the similarity criterion is violated. The performance criterion therefore excludes usage units 12 that are too weak. The connection of old usage units 12/a weak usage unit 12 is reenabled later as soon as the strand conditions match, i.e., the remaining usage units 12 are worn out to such an extent that the similarity criterion is again met.

The similarity criterion can reduce the need for load balancing. The power per usage unit (current I in the strand is the same, but a different power occurs at different voltages, which gives rise to local heating and thus ageing/wear) can be adjusted in advance. This is because load balancing requires the "weakest" usage unit to be adjusted, in that it generates the lowest voltage, i.e., it must be reduced to the lowest voltage. By beforehand creating the same or similar operating conditions using the similarity criterion, less balancing is required. For example, if the individual voltages V=4.1 Volt and V=3.9 Volt are present in a strand, balancing would need to be set to the weakest usage unit, i.e., 3.9 Volt. By measuring the internal resistance (impedance spectroscopy), the weakest usage unit (largest internal resistance) can be detected (performance criterion) and switched off from strand 11 (bridging N11). The impedance, however, is only one example of detecting a weak usage unit. Generally, detection of the weakest usage unit can depend on a state of the usage unit.

By electrically decoupling/disconnecting N14 all usage units 12 of a strand 11, the latter can also be switched to be free of HV. All usage units 12 are decoupled from one another. In this fuse mode, strand 11 can be secured for assembly, accident prevention, an emergency situation, or transport. The switching sequence is important: First, the mechanical switching units 15 (contactors) are opened, then N14 of the usage units 12 are decoupled in sequence.

The control means 19 can also be used to adjust the wear/wear level of the individual usage units 12. Wear-leveling allows for homogeneous use of the field/arrangement of usage units 12. Uniform wear is thus achieved during operation of the usage units 12. As a model, wear-leveling based on FLASH storage technology (https://en.wikipedia.org/wiki/Wear_leveling) can be used.

The advantage of equalizing the wear is the extension of the overall service life of the energy-supply device 10, since the probability of individual usage units 12 failing, e.g., due to above-average wear of an individual usage unit 12, is reduced.

The supply/consumption of energy, i.e., the exchange of energy E with a connected device 100, takes place by means of the next usage units 12, which are connected according to the wear leveling. For each usage unit 12, a current wear state is specified as a wear value. These measures are therefore intended to provide uniform wear. For example, the wear value can be represented by the impedance of usage unit 12. The wear value indicates a wear condition of usage unit 12.

For each usage unit 12, depending on the wear value, a respective setpoint can be determined for at least one operating variable, e.g., the current I during discharging and/or the individual voltage V during charging, based on an equalization criterion, whereby the equalization criterion provides that by setting each setpoint one or some or all of the usage units 12 fully perform the energy exchange E, however, a difference in the wear of the usage units 12 calculated from all the wear values is kept to a minimum. The wear of the usage units 12 is thus equalized during the energy exchange E by charging the more worn-down usage units 12 less than the less worn-down usage units 12. The latter thus continue to wear out, making their wear condition equal to that of the less charged usage units 12.

The wear value changes during operation, in fact faster if the usage unit 12 is operated at an operating point that vary from an ideal state (i.e., the usage unit continues to wear out). Therefore, protective measures are also helpful.

For this purpose, the usage units 12 are preferably operated only within a tolerance interval around an ideal charge state, which may be situated, e.g., at a charge state of 50%, and/or a current profile of an active electrical current during the energy exchange can be specified for the usage unit 12.

In general, the ideal state depends on the technology applied in the usage unit and is known in the state of the art. The ideal state of battery modules is definable by the following parameters:

SoC—State of Charge (energy content)—e.g., 50% is ideal;

DoD—Depth of Discharge—degree of discharge (current profile), e.g., the ideal state of charge 50% less maximum 20% (tolerance interval).

The specified ideal values depend on the electrochemistry and/or the intended application and must be determined for the specific energy-supply device by a specialist.

In general, DoD should remain "little," i.e., not sink too low.

The further away the current operating point is from the ideal state, the faster the wear value increases. The current operating point can be set by adjusting the charge/discharge current I for the usage units 12 accordingly. The AC/DC converter arrangement 24 can be used for setting the charging current, as can the DC converter 14 for setting the discharge current. The wear conditions/wear values of all usage units need to be adjusted as part of this.

The following represents another protective measure: Overcapacity can be provided at usage units 12. Without an additional switch, the load can be distributed by means of an overcapacity of usage units 12. This results in a lower load per usage unit 12, in that all usage units are always applied so they may wear out evenly. However, the service life is also extended due to the lower load, since if, e.g., only 100% (nominal value) of the individual capacities of the usage units 12 in the strand is tapped per strand at 110% capacity (sum of the individual capacities of the usage units 12 in the strand) along with throttling by applying the control means 19, a lower peak load per usage unit 12 is achieved. Strand 11, for example, supplies a higher voltage than needed, i.e., less current I need to flow for the same power than for a configuration of only 100% of the nominal value (rated capacity). By way of example: 12 usage units are provided, but a nominal value of only 10 usage units is made nominally available.

Without switches, 12 usage units need to be connected, but electronically only the capacity for only 10 usage units is tapped (no switching required!). This allows for weaker usage units, in that their peak currents are lower, due to the resulting higher strand voltage U, as more usage units are connected in series than are nominally available. The use of less expensive usage units [is] possible.

If switches are available, e.g., the semiconductor switches T, switching between the usage units 12 of a strand 11 can be provided, e.g., 10 usage units are always provided (yields the rated capacity) and 2 usage units are bridged.

Providing an overcapacity of usage units 12 means that the sum of the individual capacities of the usage units 12 (i.e., their combined gross capacity) is greater than the rated capacity made externally available. This allows for offsetting the failure of a usage unit. For example, the energy supply unit 10 can be provided as an energy storage unit (e.g., a battery storage unit) with a stated or nominal rated capacity (e.g., 100 kWh). In fact, a gross capacity is provided internally, which is greater than the rated capacity made available externally (actual gross capacity of, e.g., 110 kWh, greater than the net capacity of, e.g., 100 kWh). In other words, there are more usage units (e.g., battery cell modules) than needed to provide the rated capacity.

For example, only as many units are always made available externally for discharging, as indicated by the rated capacity. These usage units then become active units or "live units." The other (not actively used) storage units represent "backup units."

According to Bad Block Management (BBM), defective or spent active units are detected and removed from service. This means that in the event of failure/defect of an active unit (defective usage unit), the failed active unit can be taken out of service and a backup unit (previously inactive usage unit) placed in operation, as a new active unit. Thus, the nominal rated capacity is maintained, despite the failure of one or more usage units. The term Bad Block Management (BBM) is derived from flash-memory technology (https://en.wikipedia.org/wiki/Flash_memory#Memory_wear).

In normal operation, however, rotation or switching (e.g., according to the Round Robin algorithm or generally speaking, a preset exchange procedure) may also take place between the usage units in order for all usage units to wear out evenly. If subsequently activating a backup unit in order to replace a failed active unit, the backup unit already has electrical characteristics similar to the other active units, in that it already has a comparable degree of wear (in line with the similarity criterion). This can reduce the degree of the required load balancing, as described above.

By dividing the usage units into active and backup units, the former can also be replaced during maintenance, when the energy storage system is operated, and without impacting the rated capacity. Replaceable usage units can be separated/taken out of service as backup units and subsequently removed/replaced (dynamic change of usage units).

Bad Block Management and/or replacement can also be done by way of groups or strands, whereby a group of usage units 12 or the whole series connection 13 of a strand is then connected and/or replaced. Bad Block Management may also be performed within a usage unit 12. For example, a usage unit 12 adapted as a battery module may have several battery cells, e.g., 12 battery cells as a 3-fold series connection of 4 battery cells, each connected in parallel. A parallel connection can then be disabled, e.g., by way of bridging.

In terms of strand load management, the following may be provided:

Via the busbars 18, interconnection may be done by the DC voltage converters 14 in order to transfer energy. A strand 11 can thus be charged via several sources, e.g., 40 kW from another strand 11 and 10 kW from a mains AC/DC converter 24' in order to make available 50 kW charging power.

During the power output, a load profile may be smoothed/evened out by, e.g., providing the load with certain strands 11, even as the other strands 11 are already charging, so as to be ready for the further charging process. For example, charging with, e.g., 10 A and discharging with, e.g., 20 A can take place simultaneously (at least one strand 11 charges the device 100, at least one other strand 11 is charged by the supply network 22). A boost current (short-term peak, e.g., more than a factor of 1.5) may also be generated by connecting a strand 11.

The (thermal/electrical) load of the individual strands 11 may be limited by different strands 11 alternately supplying a connected device 100 (e.g., charging an electric vehicle). This also allows for the said DoD (Depth of Discharge) to be limited, e.g., to 20%.

The mechanical switching units 15 on each strand 11 may also be used to provide complete galvanic isolation between the strands, if connected to different busbars. This is a prerequisite for concurrently charging several devices (e.g., electric vehicles). Each EV is connected to a different 18' busbar, which is galvanically isolated from the other busbars.

Generally, the examples show how the invention may provide an energy-supply device with strands.

The invention claimed is:

1. An electrical energy-supply device comprising:
a plurality of usage units, wherein each usage unit is configured as a source of electrical energy, and wherein a control means is adapted to control an exchange of energy (E) between the energy-supply device, on the one hand, and at least one device coupled to the energy-supply device, on the other,
wherein in the energy-supply device, the usage units are divided into strands and the usage units of each strand are combined in a series connection, and the series connection is connected via a DC converter to a strand end of the strand, and each strand end of the strand is connected to a busbar arrangement via a respective galvanically isolatable switching unit, and a respective bridging circuit (N11) is provided within each strand for each usage unit, and the control means is designed to control the energy exchange (E) by controlling the respective DC converter of each strand and the at least one switching unit of each strand and the respective bridging circuit (N11) of each usage unit.

2. The energy-supply device according to claim 1, wherein the control means is designed to determine which strand is involved in a current energy exchange operation by switching the at least one switching unit of each strand, and to adjust which current (I) is provided by the respective strand by controlling the respective DC converter of each participating strand, and to determine which usage unit in the series connection of the strand supplies the current (I) and which is bridged and therefore not involved in the energy exchange operation by switching the bridging circuits (N11) of each participating strand.

3. The energy-supply device according to claim 1, wherein each usage unit comprises at least one battery cell, in particular a battery cell module or a combination of several battery cell modules and/or at least one fuel cell and/or at least one solar panel and/or at least one capacitor and/or one generator.

4. The energy-supply device according to claim 1, wherein a diagnostic unit (N12) for detecting a current state value of a preset electric parameter of the respective usage unit is provided in the strands for each usage unit, and the control means is adapted to receive, via a communication device of the energy-supply device, the state values of all the usage units of a strand and, in the strand, to operate only those usage units for the energy exchange (E), whose state values meet a preset similarity criterion, and to electrically bridge each remaining usage unit of the strand by switching the bridging circuits (N11).

5. The energy-supply device according to claim 4, wherein the diagnostic units (N12) are adapted to determine as the respective state value an impedance of the respective usage unit.

6. The energy-supply device according to claim 1, wherein the busbar arrangement has several busbars and for each strand, at least one strand end is connected via the at least one switching unit to several strand terminals, each of which is connected to a different busbar, and the at least one switching unit of the strand is adapted to select one of the strand terminals dependent on a switching signal of the control means and to galvanically connect the respective strand end to the selected strand terminal.

7. The energy-supply device according to claim 1, wherein in each strand the respective bridging circuit (N11) of the usage units has at least one semiconductor switch (T) for electrically bridging the respective usage unit, and the DC voltage converter of the strand switches in adjacent switching cycles in order to adjust an output voltage (U) output to the busbar arrangement, and the control means is adapted to switch the bridging circuit (N12) of one of the usage units between two switching cycles in order to bridge or switch to one of the usage units.

8. The energy-supply device according to claim 1, wherein the control means is adapted to adjust the input voltage of the DC converter of the strands in the respective strand by means of the bridging circuits (N11) in order to optimize the efficiency of the respective DC converter operation by selecting and connecting usage units according to a preset optimization criterion.

9. The energy-supply device according to claim 1, wherein each strand is adapted to generate a sum voltage derived from the usage units by means of its series connection, and the control means is adapted to electrically isolate the usage units from one another for a fuse mode by switching their respective bridging circuits (N11), such that only the individual voltages (V) of the usage units are present, instead of their sum voltage.

10. A method for operating an electrical energy-supply device comprising:
several usage units, each usage unit configured as a source of electrical energy, and a control means controlling an energy exchange (E) between the energy-supply device, on the one hand, and at least one device coupled to the energy-supply device, on the other,
wherein in the energy-supply device, the usage units are divided into strands and the usage units of each strand are combined to a series connection, and the series connection is connected via a DC converter to a strand end of the strand, and each of the usage units is combined to a series connection, the strand end of the strand is connected to a busbar arrangement via a respective galvanically isolatable switching unit, and a respective bridging circuit (N11) is provided within each strand for each usage unit, and the control means is designed to control the energy exchange (E), controlling the respective DC converter of each strand and the at least one switching unit of each strand and the respective bridging circuit (N11) of each usage unit in order to control the energy exchange (E).

11. The energy-supply device according to claim 2, wherein each usage unit comprises at least one battery cell, in particular a battery cell module or a combination of several battery cell modules and/or at least one fuel cell and/or at least one solar panel and/or at least one capacitor and/or one generator.

12. The energy-supply device according to claim 2, wherein a diagnostic unit (N12) for detecting a current state value of a preset electric parameter of the respective usage unit is provided in the strands for each usage unit, and the control means is adapted to receive, via a communication device of the energy-supply device, the state values of all the usage units of a strand and, in the strand, to operate only those usage units for the energy exchange (E), whose state values meet a preset similarity criterion, and to electrically bridge each remaining usage unit of the strand by switching the bridging circuits (N11).

13. The energy-supply device according to claim 3, wherein a diagnostic unit (N12) for detecting a current state value of a preset electric parameter of the respective usage unit is provided in the strands for each usage unit, and the control means is adapted to receive, via a communication device of the energy-supply device, the state values of all the usage units of a strand and, in the strand, to operate only those usage units for the energy exchange (E), whose state values meet a preset similarity criterion, and to electrically bridge each remaining usage unit of the strand by switching the bridging circuits (N11).

14. The energy-supply device according to claim 2, wherein the busbar arrangement has several busbars and for each strand, at least one strand end is connected via the at least one switching unit to several strand terminals, each of which is connected to a different busbar, and the at least one switching unit of the strand is adapted to select one of the strand terminals dependent on a switching signal of the control means and to galvanically connect the respective strand end to the selected strand terminal.

15. The energy-supply device according to claim 3, wherein the busbar arrangement has several busbars and for each strand, at least one strand end is connected via the at least one switching unit to several strand terminals, each of which is connected to a different busbar, and the at least one switching unit of the strand is adapted to select one of the strand terminals dependent on a switching signal of the control means and to galvanically connect the respective strand end to the selected strand terminal.

16. The energy-supply device according to claim 4, wherein the busbar arrangement has several busbars and for each strand, at least one strand end is connected via the at least one switching unit to several strand terminals, each of which is connected to a different busbar, and the at least one switching unit of the strand is adapted to select one of the strand terminals dependent on a switching signal of the control means and to galvanically connect the respective strand end to the selected strand terminal.

17. The energy-supply device according to claim 5, wherein the busbar arrangement has several busbars and for each strand, at least one strand end is connected via the at least one switching unit to several strand terminals, each of which is connected to a different busbar, and the at least one switching unit of the strand is adapted to select one of the strand terminals dependent on a switching signal of the control means and to galvanically connect the respective strand end to the selected strand terminal.

18. The energy-supply device according to claim 2, wherein in each strand the respective bridging circuit (N11) of the usage units has at least one semiconductor switch (T) for electrically bridging the respective usage unit, and the DC voltage converter of the strand switches in adjacent switching cycles in order to adjust an output voltage (U) output to the busbar arrangement, and the control means is adapted to switch the bridging circuit (N12) of one of the usage units between two switching cycles in order to bridge or switch to one of the usage units.

19. The energy-supply device according to claim 3, wherein in each strand the respective bridging circuit (N11) of the usage units has at least one semiconductor switch (T) for electrically bridging the respective usage unit, and the DC voltage converter of the strand switches in adjacent switching cycles in order to adjust an output voltage (U) output to the busbar arrangement, and the control means is adapted to switch the bridging circuit (N12) of one of the usage units between two switching cycles in order to bridge or switch to one of the usage units.

20. The energy-supply device according to claim 4, wherein in each strand the respective bridging circuit (N11) of the usage units has at least one semiconductor switch (T) for electrically bridging the respective usage unit, and the DC voltage converter of the strand switches in adjacent switching cycles in order to adjust an output voltage (U) output to the busbar arrangement, and the control means is adapted to switch the bridging circuit (N12) of one of the usage units between two switching cycles in order to bridge or switch to one of the usage units.

\* \* \* \* \*